(12) United States Patent
Bouzguenda et al.

(10) Patent No.: US 11,841,222 B1
(45) Date of Patent: Dec. 12, 2023

(54) PRECISION SHAFT ALIGNMENT METHOD AND DEVICE

(71) Applicant: KING FAISAL UNIVERSITY, Al-Ahsa (SA)

(72) Inventors: Mounir Bouzguenda, Sfax (TN); Brahim Ben Smida, Kebili (TN)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/238,658

(22) Filed: Aug. 28, 2023

(51) Int. Cl.
*G01B 5/25* (2006.01)

(52) U.S. Cl.
CPC .................................... *G01B 5/25* (2013.01)

(58) Field of Classification Search
CPC ........................................................ G01B 5/25
See application file for complete search history.

(56) References Cited

U.S. PATENT DOCUMENTS

| | | | | |
|---|---|---|---|---|
| 4,161,068 A | * | 7/1979 | McMaster | G01B 11/27 33/645 |
| 4,413,415 A | * | 11/1983 | Stovall | G01B 5/25 269/902 |
| 4,516,328 A | * | 5/1985 | Massey | G01B 5/25 33/645 |
| 5,199,182 A | | 4/1993 | Fowler | |
| 5,621,655 A | | 4/1997 | Nower et al. | |
| 7,111,407 B2 | * | 9/2006 | Jones | G01C 15/10 33/529 |
| 9,329,017 B2 | * | 5/2016 | Spomer | G01F 1/8413 |
| 11,761,748 B1 | * | 9/2023 | Bouzguenda | G01B 5/25 33/286 |
| 2008/0201097 A1 | | 8/2008 | Stromberg et al. | |
| 2012/0209408 A1 | | 8/2012 | Vietsch | |
| 2013/0111768 A1 | | 5/2013 | Lenz | |
| 2020/0124409 A1 | | 4/2020 | Jozokos | |
| 2021/0132405 A1 | * | 5/2021 | Lamontagne | G01B 5/25 |

* cited by examiner

*Primary Examiner* — Yaritza Guadalupe-McCall
(74) *Attorney, Agent, or Firm* — Nath, Goldberg & Meyer; Richard C. Litman

(57) ABSTRACT

A system and method for aligning multiple pieces of rotary machinery equipment by coupling rotating shafts extending from at least one of the multiple pieces of rotary machine equipment. The system includes mounting a first piece of rotary machine equipment to a device comprising three U-shaped plates that are interlocked with each other. The alignment method includes a process for adjusting the first piece of rotary equipment with respect to a first U-shaped plate to correct for both a horizontal offset and a vertical offset.

6 Claims, 4 Drawing Sheets

PRECISION SHAFT ALIGNMENT METHOD AND DEVICE

BACKGROUND

1. FIELD

The present disclosure relates to a shaft alignment method and device for effecting shaft alignment between separate pieces of rotating equipment.

2. DESCRIPTION OF THE RELATED ART

Rotating machinery, equipment and other devices can be provided in many form factors, such as an electrical motor, a combustion motor, a pump, a transmission, or other gear box, etc. Rotating equipment is commonly configured to couple at least two rotating devices together, referred to as a machine train. The configuration can couple two or more devices together, such as pumps, motors, and the like to provide serial addition of power or parallel functionality, respectively. Alternatively, the configuration can couple two or more dissimilar devices together, such as coupling a motor and a transmission, coupling a motor and a pump, and the like to provide joint functionality. In any configuration, alignment between two adjacent components impacts the reliability and operation of the equipment.

Shaft misalignment is a root cause of more than 50% of rotating equipment operational faults and undesired downtime. Current methods and devices focus upon fault measuring and post measurement adjustment with inaccurate methods and devices for the same.

Many factors can impact alignment between equipment pieces. Alignment of the equipment dictates that the equipment remains stationary and thus the alignment process is completed when the equipment is in a non-operational state. Additionally, the alignment process is normally completed in an ambient environment. Unfortunately, this removes a number of variables which impact the alignment during operation, where those variables are only present during operation. Those variables can include thermal effects on the equipment pieces, balance of rotational elements, changes in compressive components such as soft feet, changes due to torsional effects, and the like. Further, the operational environment commonly changes in temperature, which can affect the mounting area, the equipment, and the like. In most operational scenarios, the equipment and operating environment increases in temperature, impacting the alignment between adjacent temperature. Each individual machine arrangement is unique resulting in differing characteristics. Even identical sets of machinery can dictate different terms for alignment.

Laser alignment was introduced in the 1980's and utilizes one or more diode lasers and detectors (PSD's). The PSDs are able to detect fairly accurate (within 10 μm's) relative positioning between two adjacent shafts. Information is provided to a service person through a display unit. The system determines what information needs to be conveyed to the service person in order to direct the service person on what is required to optimize alignment between two components. The display unit can be provided in any of many known forms, including a computer, preferably comprising a wireless interface. Software converts the detector signals into a set of instructions in an understandable format for the operator or service person where the alignment or component registration is commonly defined by two factors: angular misalignment and parallel/offset misalignment. Another factor that should be considered is end-to-end registration, ensuring that a sufficient gap is provided for thermal expansion, vibrations, and the like. The fundamental setup of the laser alignment method and instrumentation has remained mostly unchanged since its inception and initial application in the 1980's, including a diode laser system with a detector and a portable computer with standard alignment software.

In aligning machinery, it is generally understood by craftspeople that a phenomenon of 'soft foot' can occur. 'Soft Foot' is a common term used for machine frame distortion which is caused when one or more feet of a machine differ in height from the others. This in turn may be due to differences when the machine was manufactured, a squishy footage with oil film, etc. between foot and base, a bent foot, or it may even be induced by a pipe or rod to which the machine is attached, which prevents the machine from touching all of its feet to its base. Such a discrepancy in foot alignment can result in vibration in itself or magnify vibration occurring from some other source.

Substantial progress towards a solution to this shaft alignment problem has been made by others. For instance, Stromberg et al., (U.S. 2008/0201097 A1) propose a method and an instrument with a graphical user interface using sensors for data acquisition and a controller that calculate the correction value for a satisfactory alignment. The main contribution relates to the measuring and the display that assist the aligning technician. Subsequently, the correction is done using shims and dial indicators. Additionally, Nower et al., (U.S. Pat. No.: 5,621,655) have proposed a management alignment system containing a dial indicator alignment fixture and a portable alignment analyzer interconnected with a computer. The alignment database is stored, updated, and reused with minor changes. The machine is moved vertically by adding or removing shims under its feet. Furthermore, Lenz (U.S. 2013/0111768 A1) produces a method for measuring the angular offset of tow shafts coupled by tow universal joints. This method is specific for this kind of joint with a parallel offset between the driver and driven shafts. The gap is remedied using shims and moves.

Also, Vietsch (U.S. 2012/0209408 A1) proposes a predictive alignment monitoring method that predicts the suitable alignment under environmental condition changes such as clearance of the shaft and the mechanical strain at the operation state. This method is very useful in optimizing the operating alignment and making the decision based on conditions being monitored. In addition, Vietsch enumerates the diagram blocks for the alignment process, the monitored conditions, and the common specific materials required for the alignment process.

Zatezalo et al., (U.S. Pat. No.: 4,463,438) proposes a shaft alignment calculator that assists the user to overcome the difficulty of measuring the gap between the drive and driven machine.

Massey (U.S. Pat. No.: 4,516,328) presents a shaft alignment device using a two dial indicator as a measuring instrument. The alignment technique is inspired from the reverse method with a specific apparatus.

In this perspective, the current shaft alignment methods connect three main constitutive parts: the condition monitoring and decision-making, the gap measurement, and the adjustment modalities. Accordingly, there remains a need in the art for a method and device for preventing shaft misalignment between pieces of equipment such that the deleterious effects from soft feet are reduced.

SUMMARY

The present subject matter is directed towards a method and device of optimizing alignment between two adjacent rotating machines. The present disclosure is directed towards a precision shaft alignment method and device which optimizes and retains alignment of a series of pieces of rotating equipment coupled together for cooperative operation. More specifically, the present subject matter is directed to the observation, recordation, and utilization of various characteristics of a series of pieces of rotating equipment to optimize and retain alignment therebetween.

Alignment of the rotating machinery according to the present subject matter can be accomplished while the machinery is in an operational state. The alignment process considers any relation between the adjacent pieces of rotating machines. The term machine can refer to any device comprising a rotating mechanism, and should be synonymous with machine, equipment, device, apparatus, and the like.

In one embodiment, the present subject matter relates to a method of optimizing alignment between two adjacent rotating machines comprising: obtaining initial alignment data respective to alignment between a pair of adjacently located rotating machines; monitoring, collecting, recording, and storing equipment condition data during an operation of each adjacently located rotating machine; analyzing the recorded equipment condition data to determine optimal alignment characteristics of the adjacently located rotating machines during an operational condition; and aligning the adjacently located rotating machines using the optimal alignment characteristics.

In another embodiment, the present subject matter is directed to a device which, when implemented with the method, performs the function of optimizing the alignment between the two adjacent rotating machines.

In this regard, the present subject matter includes a device for rotating machinery alignment, comprising: an inner U-shaped metal plate with four vertical slot-like openings; an outer U-shaped metal plate with four vertical slot-like openings; wherein the inner U-shaped metal plate is situated along an interior surface of the outer U-shaped metal plate such that each one of said four vertical slot-like openings of said inner U-shaped metal plate partially overlaps with a corresponding each one of said four vertical slot-like openings of said outer U-shaped metal plate, wherein a first bolt and nut arrangement comprising four first bolt and nut pairs locks in place said inner U-shaped metal plate to said outer U-shaped metal plate at a portion where said each one of said four vertical slot-like openings of said inner U-shaped metal plate partially overlaps with the corresponding each one of said four vertical slot-like openings of said outer U-shaped metal plate, and wherein a first piece of rotating machinery equipment is mounted to a top side of a large flat portion of said inner U-shaped metal plate by means of four holes in said large flat portion of said inner U-shaped metal plate, each of said four holes receiving a second bolt and nut arrangement comprising four second bolt and nut pairs to secure the first piece of rotating machinery equipment in place on the top side of the large flat portion of said inner U-shaped metal plate.

These and other features of the present subject matter will become readily apparent upon further review of the following specification.

DETAILED DESCRIPTION OF EMBODIMENTS

Figure 1:
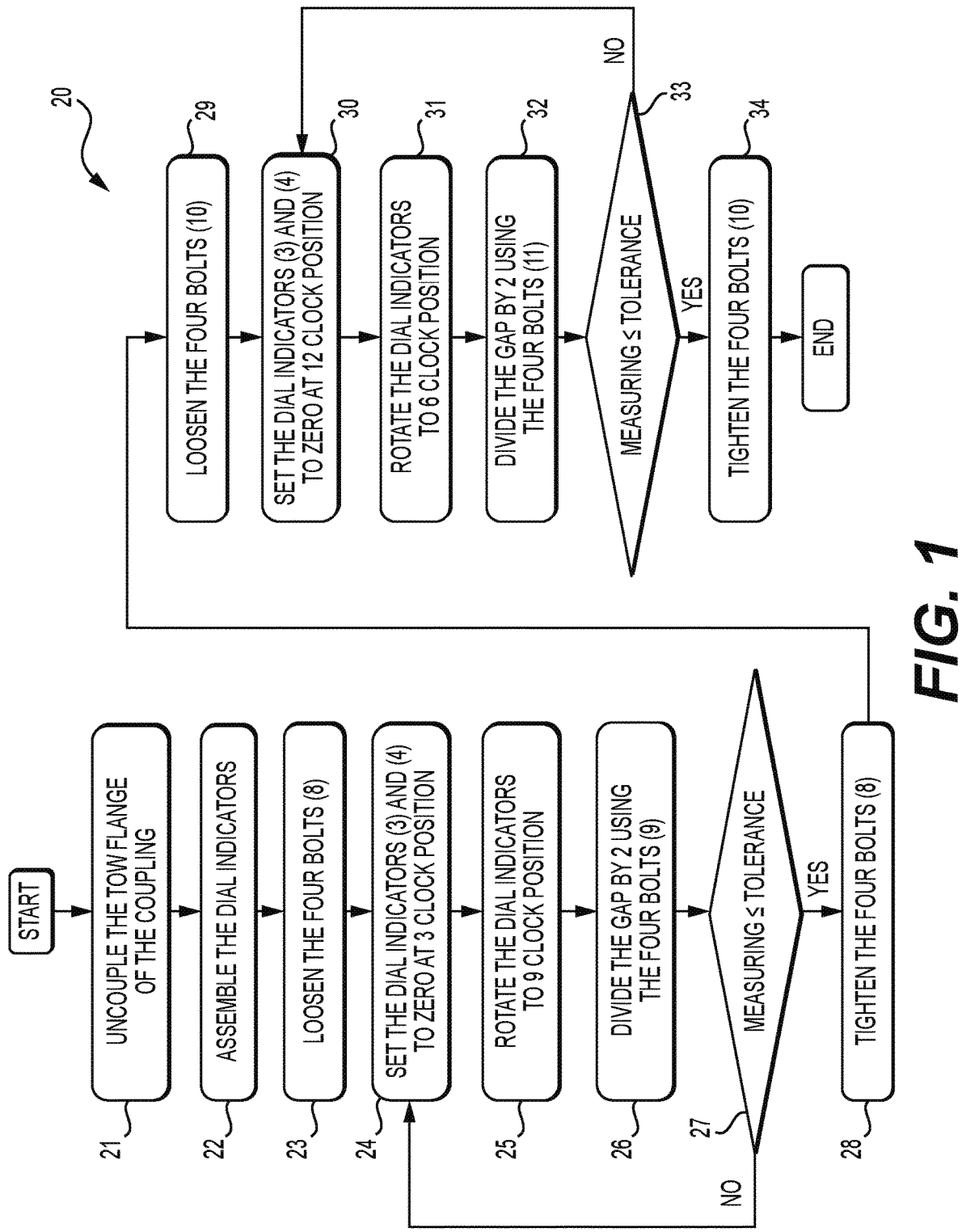
FIG. 1 is a flow diagram of the method for shaft alignment.

The following definitions are provided for the purpose of understanding the present subject matter and for construing the appended patent claims.

Definitions

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where devices are described as having, including, or comprising specific components, or where processes are described as having, including, or comprising specific process steps, it is contemplated that devices of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a device or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The following detailed description is merely exemplary in nature and is not intended to limit the described embodiments or the application and uses of the described embodiments. Any implementation described herein with the words "exemplary" or "illustrative" is not necessarily construed as preferred or advantageous over other implementations. All of the implementations described below are exemplary implementations provided to enable persons skilled in the art to make or use the embodiments of the disclosure and are not intended to limit the scope of the disclosure, which is defined by the claims. For the purposes of the description herein, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the concepts defined in the appended claims. Hence, specific dimensions and other physical characteristics relating to the embodiments disclosed therein are not to be considered as limiting, unless the claims expressly state otherwise.

Figure 2:
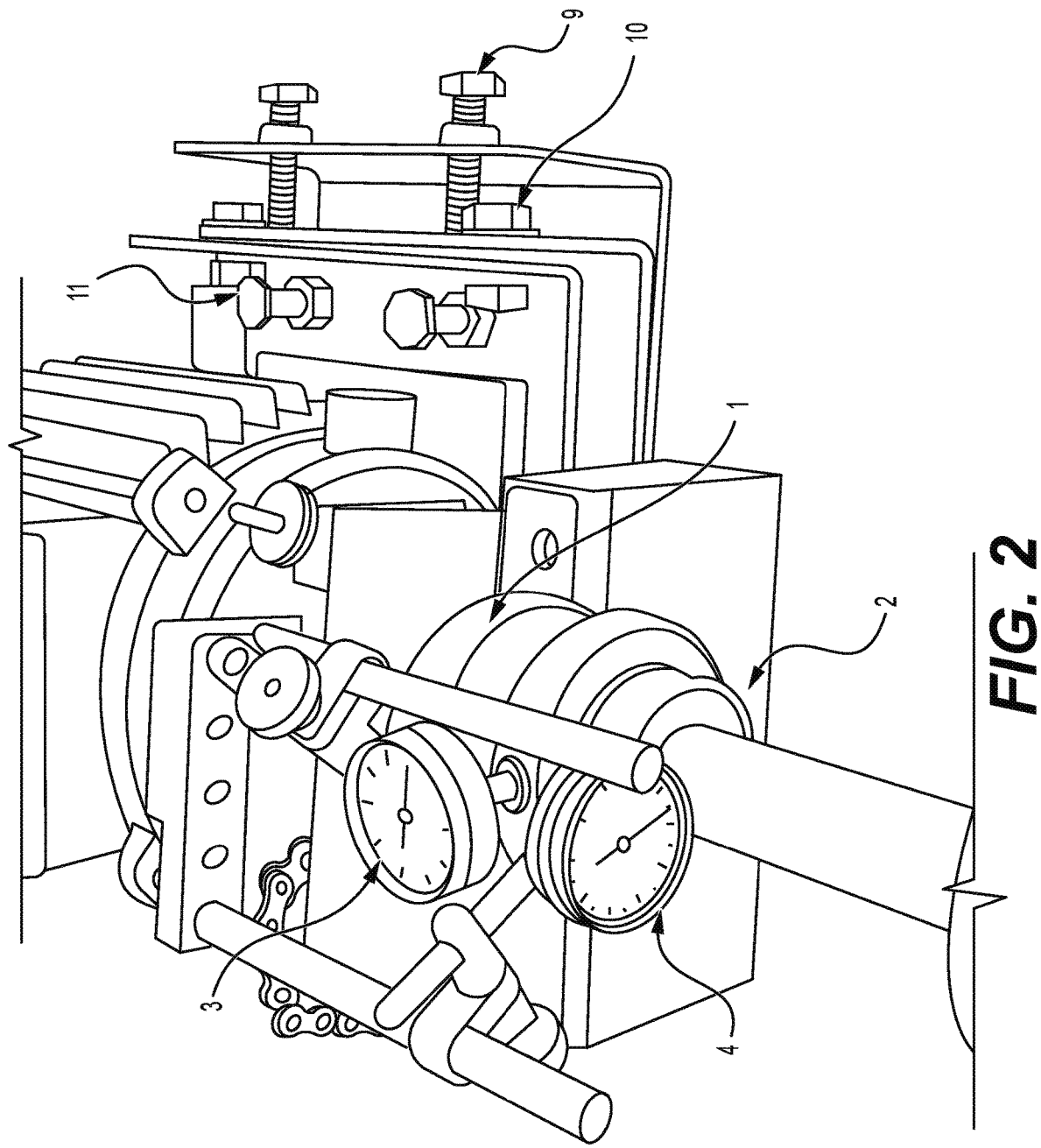
FIG. 2 is a front view of the device used for shaft alignment

Rotating machinery commonly involves coupling adjacent machines together for operation as is shown in FIG. 2. Misalignment between adjacent rotating machines can impact the configuration in a variety of ways, including premature failure as in the following examples: 1) Increased frequency of parts replacement, such as bearings, couplings, seals, and the like, which result in additional operational costs including replacement parts and labor; 2) Increased logistics costs, including materials procurement, inventory holding costs, materials management costs, and the like; 3) Increased frequency of interventions, including man hours, materials, tools, transportation, and the like, thus adding associated intervention costs to the overall operating budgets; and 4) where applicable, impacts from resultant downtime of the machinery, including reduction in productivity, reduced labor efficiencies (revenue per labor cost), reduced real estate efficiency (revenue per area of real estate), lost revenue and the like.

Alignment of the machinery can be done while the machinery is in an operational or non-operational state. The alignment process considers any relation between adjacent pieces of rotating equipment or rotating machines. The term machine can refer to any device comprising a rotating mechanism, and should be synonymous with machine, equipment, device, apparatus, and the like.

Prior art methods rely upon the strategic placement of shims under one or more feet of the rotating equipment in order to ensure that the desired alignment is achieved. However, the use of one or more shims under one or more feet of the rotating equipment for achieving the desired alignment is not optimal as relying on a stacked arrangement of shims can only be implemented for gaps a limited thickness. Additionally, the use of shims is not a streamlined process but one where multiple measurements and adjustments in shim positioning must be performed in order to arrive at a desired positioning that eliminates the extant problem of rotating equipment misalignment. And lastly, reliance upon shims for solving misalignment has a further drawback of having the shims degrade over time due to stress and pressure generated by the rotating equipment's bulk and weight. Accordingly, the shims would have to be periodically replaced as they break down over time.

Figure 4:
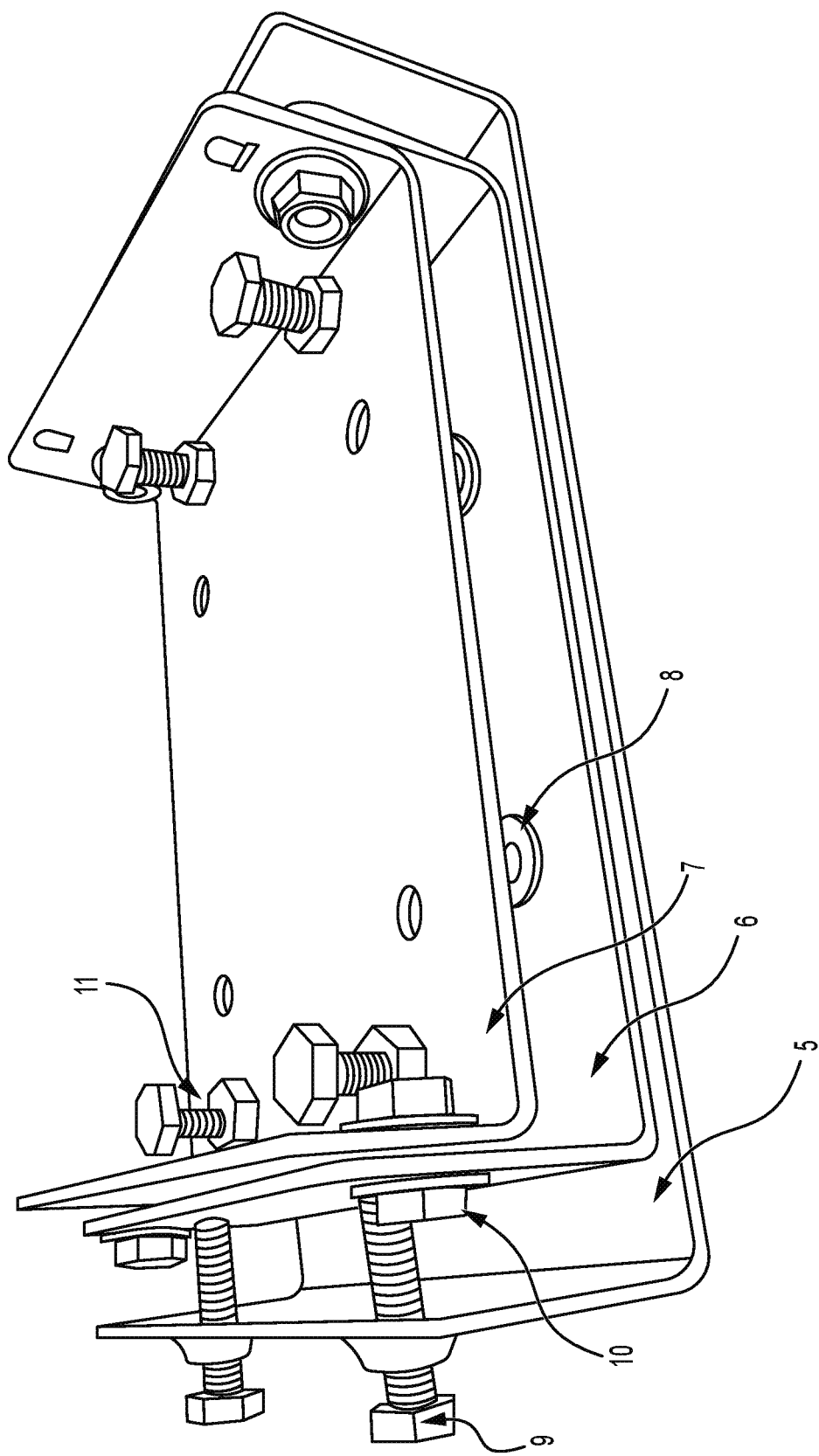
FIG. 4 is a view of the device formed from three interlocking U-shaped plates Similar reference characters denote corresponding features consistently throughout the attached drawings.

In a first embodiment, the main objective of the proposed method is to contribute to making the shaft alignment process easier to implement and more cost conscious for any skilled practitioner in the field. The shaft alignment method draws its inspiration from the principles of numerical dichotomy or a bisectional numerical solving method. It is iterative and for each step, the user divides the gap by two using an adjustment apparatus for implementing the method where the apparatus as shown in FIG. 4 and consists of three interlocking U-shaped plates (5, 6, 7). The stop criteria is when the desired tolerance is reached.

The main objective of the present subject matter is to propose a new easy and fast aligning method between a driver shaft (motor) with a driven one (pump) by using the device as shown in FIG. 4. The steps of the aligning method are summarized in FIG. 1. After starting the process, in step 21, the tow flange of the coupling is uncoupled. In step 22, the dial indicators are assembled and calibrated. In step 23, the four bolts (8) connecting the intermediate U-shaped plate (6) to the outer U-shaped plate (5) are loosened. Two dial indicators are mounted, one mounted in the rim (3) as shown in FIG. 2, measuring the offset and the other dial mounted on the face (4) measuring the angularity of the misalignment. After that, in step 24, the dial indicators (3, 4) are set to zero at the 3 o'clock position, and then in step 25, rotate them to the 9 o'clock position.

The proposed aligning method is made up of two main steps. The first one is the horizontal correction and the second one is vertical correction. Next in step 26, divide the gap by two using the four bolts (9) in the outer U-shaped plate (5) device and set the indicators to zero. Then check for gap tolerance in step 27. If the desired tolerance is not achieved, loop back to step 24, and rotate the measuring device to the 3 o'clock position. Repeat the previous steps of 24-27, if the gap is more than the desired tolerance. Otherwise, four bolts (8) as in step 28 can be tightened and the second main step for vertical correction of the method can be started by loosening the four bolts (10) of the intermediate U-shaped plate (6) as in step 29. Afterward, set the two dial indicators (3) and (4) to zero at the 12 o'clock position in step 30 and rotate them to the 6 o'clock position in step 31.

Following that, in step 32, divide the gap by 2 using the four bolts (11) of the innermost U-shaped plate, and measure the tolerance in step 33. If the desired tolerance is not achieved, loop back to step 30, and set the indicator to zero, and rotate it to the 12 o'clock position. If the gap remains more than the tolerance after initial passes, then repeat the previous steps 30-33 until the desired tolerance is achieved. Otherwise, in step 34, the bolts (10) of the intermediate U-shaped plate can be tightened, and the adjustment is done. All bolts are tightened with a spring washer to avoid looseness.

As shown in FIG. 2, in a non-limiting exemplary embodiment, a mounted first rotating motor (1) is located adjacent to a mounted second rotating pump (not shown) by means of a shaft. The exemplary first and second mounted machines are a motor and a pump, respectively, but it could be equally appreciated by those of ordinary skill in the art that the machines could include any rotating machinery including electrically operated motors, combustion motors, transmissions, turbines, and the like.

Figure 3:
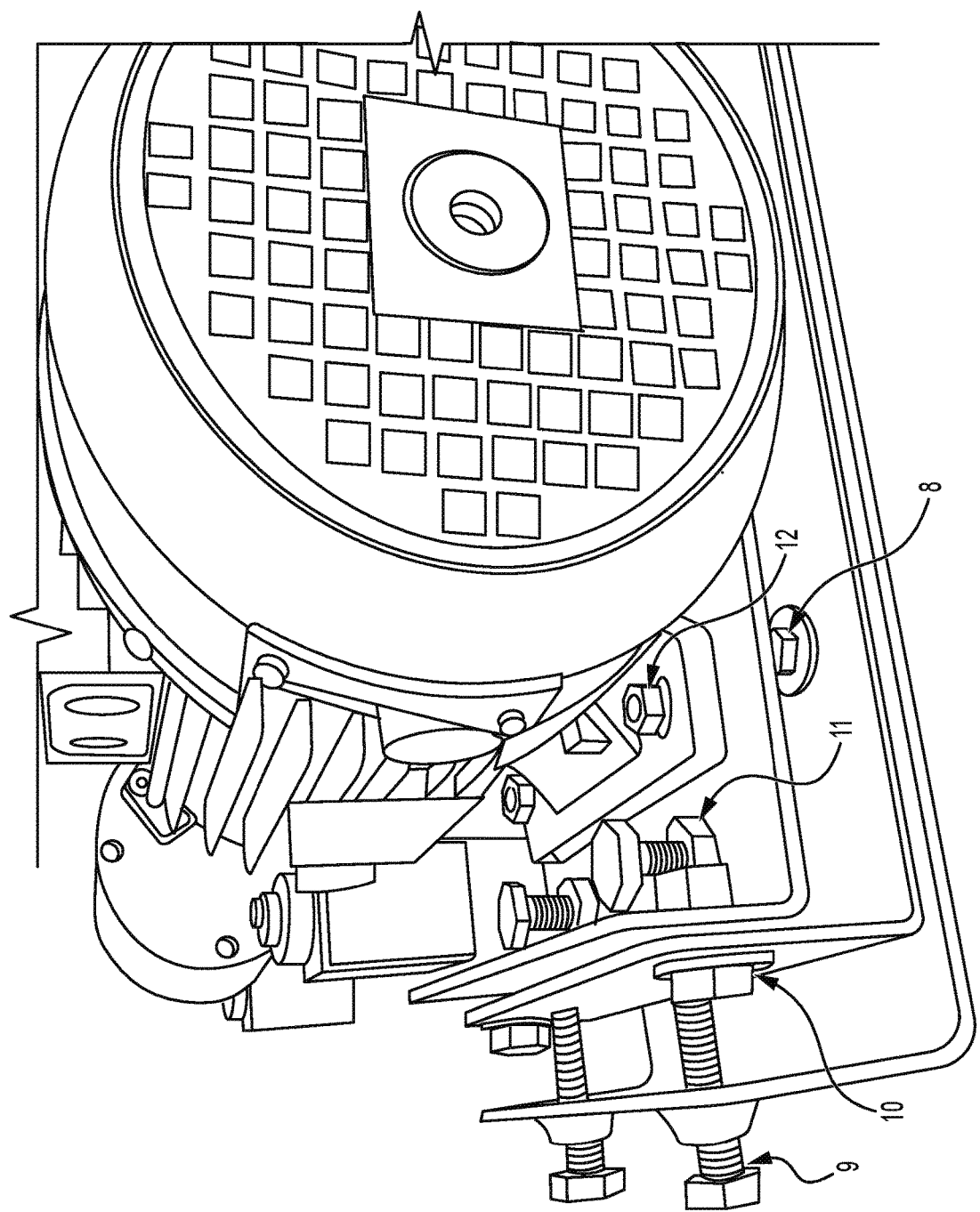
FIG. 3 is a back view of the device used for shaft alignment.

As shown in FIG. 4, the proposed device can be made of three metal sheets with a U-shape where a first inner U-shaped metal sheet (7) interlocks with a second intermediate U-shaped metal sheet (6) in a vertically and slidably engaging fashion using a quartet of nuts and bolts (10). The third outer U-shaped metal sheet is mounted by its base to a surface using a quartet of a nut and bolt arrangement (8) and makes contact with the outer surface of the second intermediate U-shaped plate (5) by a quartet of nut and bolt arrangements (9) where the distal end of each bolt, when fastened through a respective foursome of circular holes in the outer U-shaped plate, provides pressure against the outer surface of the intermediate U-shaped plate to secure the intermediate U-shaped plate in place. The slidable engagement between the inner and the intermediate U-shaped metal sheets is achieved by the alignment of a respective quartet of inner U-shaped metal sheet vertical slots with a respective quartet of intermediate U-shaped metal sheet vertical slots where each slot is positioned fixedly with its respective counterpart by means of a tightened nut and bolt combination (10). The first rotating motor (1) is attached to the inner U-shaped metal sheet (7) at four holes with four nut and bolt combinations (12) in a manner as shown in FIG. 3.

The device is used to correct the horizontal offset and vertical offset with the shaft alignment method discussed above. The intent is to align the motor (1) with the driven equipment such as the pump (not shown). The motor is bolted to the upper part of the device at the inner U-shaped metal sheet using for nut/bolt combinations (12) at four holes as shown in FIGS. 3-4. When the horizontal offset and vertical offset is reached, the bolts are tightened to preserve the desired orientation and position of the motor with respect to the pump.

It is to be understood that rotating machinery alignment method and device is not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A device for rotating machinery alignment, comprising:
    an inner U-shaped metal plate with four vertical slot-like openings;
    an intermediate U-shaped metal plate with four vertical slot-like openings;
    an outer U-shaped metal plate with four circular openings;
    wherein the inner U-shaped metal plate is situated along an interior surface of the intermediate U-shaped metal plate such that each one of said four vertical slot-like openings of said inner U-shaped metal plate partially overlaps with a corresponding each one of said four vertical slot-like openings of said intermediate U-shaped metal plate,
    wherein the intermediate U-shaped metal plate is situated along an interior surface of the outer U-shaped metal plate,
    wherein a first bolt and nut arrangement comprises a first foursome of bolt and nut pairs protruding respectively through said four circular openings such that a distal end of each of said bolts abuts against an outer surface of said intermediate U-shaped plate and locks in place said intermediate U-shaped metal plate with respect to said outer U-shaped metal plate,
    wherein a second bolt and nut arrangement comprising said each one of said four vertical slot-like openings of said inner U-shaped metal plate partially overlaps with the corresponding each one of said four vertical slot-like openings of said intermediate U-shaped metal plate, and
    wherein a first piece of rotating machinery equipment is mounted to a top side of a large flat portion of said inner U-shaped metal plate by means of four holes in said large flat portion of said inner U-shaped metal plate, each of said four holes receiving a third bolt and nut arrangement comprising four third bolt and nut pairs to secure the first piece of rotating machinery equipment in place on the top side of the large flat portion of said inner U-shaped metal plate.

2. The device for rotating machinery alignment as recited in claim 1, wherein said outer U-shaped metal plate has an additional quartet of holes in a bottom surface of said outer U-shaped metal plate for mounting the bottom surface of said outer U-shaped metal plate to a fixed surface for stability.

3. The device for rotating machinery alignment as recited in claim 2, further comprising a fourth bolt and nut arrangement comprising four fourth bolt and nut pairs, wherein each hole in said additional quartet of holes receives one of said four fourth bolt and nut pairs.

4. The device for rotating machinery alignment as recited in claim 2, wherein the inner U-shaped metal plate has a second quartet of holes and a bolt and dual nut arrangement comprising four sets of one bolt and two nuts each, wherein which each hole in said second quartet of holes receives one of said sets of one bolt and two nuts.

5. The device for rotating machinery alignment as recited in claim 4, wherein the first piece of rotating machinery equipment is positioned to have proper alignment with a second piece of rotating machinery equipment by simultaneously manipulating all four sets of one bolt and two nuts to properly align a shaft of said first piece of rotating machinery equipment with said second piece of rotating machinery equipment to correct for a misalignment due to a horizontal offset and a vertical offset.

6. The device for rotating machinery alignment as recited in claim 4, wherein the first piece of rotating machinery equipment is positioned to have proper alignment with a second piece of rotating machinery equipment by manipulating a single set of one bolt and two nuts to properly align a shaft of said first piece of rotating machinery equipment with a second piece of rotating equipment to correct for a misalignment due to angularity.

* * * * *